US010196964B2

(12) United States Patent
Braun et al.

(10) Patent No.: US 10,196,964 B2
(45) Date of Patent: Feb. 5, 2019

(54) CHARGE AIR COOLER AND METHOD

(71) Applicant: Modine Manufacturing Company, Racine, WI (US)

(72) Inventors: Jason Braun, Franksville, WI (US); Frank Lippke, Filderstadt (DE); Steven Meshenky, Mt. Pleasant, WI (US); Ashutosh Patil, Racine, WI (US); Mitchell Crawford, Cudahy, WI (US); Kyle Shisler, Muskego, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 354 days.

(21) Appl. No.: 15/173,909

(22) Filed: Jun. 6, 2016

(65) Prior Publication Data
US 2016/0356205 A1 Dec. 8, 2016

Related U.S. Application Data

(60) Provisional application No. 62/172,519, filed on Jun. 8, 2015.

(51) Int. Cl.
*F02B 29/04* (2006.01)
*F02B 33/00* (2006.01)
(Continued)

(52) U.S. Cl.
CPC ......... *F02B 29/0443* (2013.01); *B60H 1/323* (2013.01); *F02B 29/0412* (2013.01);
(Continued)

(58) Field of Classification Search
CPC .............. F02B 29/0443; F02B 29/0412; F02B 29/0437; F02B 29/0462; F02B 29/0406; F28D 9/005
(Continued)

(56) References Cited

U.S. PATENT DOCUMENTS

| 4,317,439 A | 3/1982 | Emmerling |
| 5,394,854 A | 3/1995 | Edmaier et al. |

(Continued)

FOREIGN PATENT DOCUMENTS

| DE | 2655017 C2 * | 9/1986 | ................ F01P 3/18 |
| DE | 102005044291 A1 | 3/2007 | |

(Continued)

OTHER PUBLICATIONS

Chinese Patent Office Action for Application No. 201610399563.1 dated Apr. 25, 2018 (17 pages, English translation included).

*Primary Examiner* — Ngoc T Nguyen
(74) *Attorney, Agent, or Firm* — Michael Best & Friedrich LLP; Jeroen Valensa; Michael Bergnach

(57) ABSTRACT

A charge air cooler includes a first, second, and third heat exchange sections. In the first heat exchange section, heat is transferred from a first flow of liquid coolant to a refrigerant in order to cool the first flow of liquid coolant from a first temperature to a second temperature. In the second heat exchange section, heat is transferred from a flow of charge air to a second flow of liquid coolant in order to cool the flow of charge air from a third temperature to a fourth temperature. In the third heat exchange section, heat is transferred from the flow of charge air to the first flow of liquid coolant in order to cool the flow of charge air from the fourth temperature to a fifth temperature, the fifth temperature being less than the first temperature.

15 Claims, 9 Drawing Sheets

(51) Int. Cl.
*F02M 35/10* (2006.01)
*B60H 1/32* (2006.01)
*F28D 9/00* (2006.01)
*F28D 21/00* (2006.01)

(52) U.S. Cl.
CPC ... *F02B 29/0462* (2013.01); *F02M 35/10268* (2013.01); *F28D 9/005* (2013.01); *F28D 9/0056* (2013.01); *F28D 9/0093* (2013.01); *F28D 2021/0082* (2013.01); *Y02T 10/146* (2013.01)

(58) Field of Classification Search
USPC .............................................. 60/599; 123/563
See application file for complete search history.

(56) References Cited

U.S. PATENT DOCUMENTS

| | | | |
|---|---|---|---|
| 5,896,834 | A | 4/1999 | Gruner |
| 6,755,158 | B2 | 6/2004 | Knecht et al. |
| 6,796,134 | B1 | 9/2004 | Bucknell et al. |
| 6,918,434 | B2 | 7/2005 | Strahle |
| 7,721,543 | B2 | 5/2010 | Massey et al. |
| 8,225,852 | B2 | 7/2012 | Wu et al. |
| 8,434,433 | B2 | 5/2013 | Ouradnik et al. |
| 8,695,340 | B2 * | 4/2014 | Kardos ............... F02B 29/0412 123/568.12 |
| 8,960,168 | B2 * | 2/2015 | Kardos ................... F01N 3/023 123/568.12 |
| 2002/0011242 | A1 | 1/2002 | Ruppel et al. |
| 2004/0250800 | A1 | 12/2004 | Nechvatal |
| 2006/0278377 | A1 * | 12/2006 | Martins ............... F02B 29/0412 165/140 |
| 2007/0125527 | A1 * | 6/2007 | Flik ..................... F02B 29/0412 165/140 |
| 2008/0041556 | A1 | 2/2008 | Braun et al. |
| 2009/0031999 | A1 | 2/2009 | Erickson |
| 2010/0263369 | A1 * | 10/2010 | Kardos ............... F02B 29/0412 60/599 |
| 2011/0315130 | A1 * | 12/2011 | Kardos ................... F01N 3/023 123/568.12 |
| 2012/0060550 | A1 | 3/2012 | Mann |
| 2012/0234523 | A1 | 9/2012 | Jouannny et al. |
| 2013/0276763 | A1 | 10/2013 | Eilemann et al. |
| 2014/0230797 | A1 * | 8/2014 | Meshenky .......... F02B 29/0462 123/542 |
| 2015/0040874 | A1 * | 2/2015 | Isermeyer .......... B60H 1/00271 123/563 |
| 2016/0003128 | A1 * | 1/2016 | Berger ................ F02B 29/0443 165/145 |

FOREIGN PATENT DOCUMENTS

| | | |
|---|---|---|
| DE | 102010040829 A1 | 3/2012 |
| DE | 102013215608 A1 | 2/2015 |
| EP | 2835514 A1 | 2/2015 |

* cited by examiner

CHARGE AIR COOLER AND METHOD

CROSS-REFERENCE TO RELATED APPLICATIONS

This application claims priority to U.S. Provisional Patent Application No. 62/172,519, filed Jun. 8, 2015, the entire contents of which are hereby incorporated by reference.

BACKGROUND

Charge air coolers are used in conjunction with turbocharged internal combustion engine systems. In such systems, residual energy from the combustion exhaust is recaptured through an exhaust expansion turbine, and the recaptured energy is used to compress or "boost" the pressure of the incoming air (referred to as the "charge air") being supplied to the engine. This raises the operating pressure of the engine, thereby increasing the thermal efficiency and providing greater fuel economy.

The compression of the charge air using the exhaust gases typically leads to a substantial increase in temperature of the air. Such a temperature increase can be undesirable for at least two reasons. First, the density of the air is inversely related to its temperature, so that the amount of air mass entering the combustion cylinders in each combustion cycle is lower when the air temperature is elevated, leading to reduced engine output. Second, the production of undesirable and/or harmful emissions, such as oxides of nitrogen, increases as the combustion temperature increases. The emissions levels for internal combustion engines is heavily regulated, often making it necessary to control the temperature of the air entering the combustion chambers to a temperature that is relatively close to the ambient air temperature. As a result, cooling of the charge air using charge air coolers has become commonplace for turbocharged engines.

Cooling of the charge air is typically accomplished using either direct ambient air to charge air heat exchangers, or indirect liquid cooled charge air heat exchangers. Usually, and especially when the combustion engine is associated with a vehicle, any waste heat generated must eventually be rejected to the ambient air. In a charge air cooler that is directly cooled by ambient air, the charge air is more easily cooled to a low temperature (i.e. a temperature approaching the ambient air temperature). Packaging such a charge air cooler into a compact system can pose challenges, however, as the flow conduits necessary for routing the charge air are often large in order to avoid undesirable pressure loss, and the directly cooled charge air cooler must be located so that a flow of ambient cooling air can be directed through it.

To that end, it has become commonplace in some compact systems to cool the charge air by rejecting heat to a liquid coolant loop. Such a cooling system can be referred to as indirect charge air cooling, as the heat must be transferred first to a liquid cooling loop and subsequently from the liquid cooling loop to the ambient air. Certain advantages can be provided with such an arrangement. Liquid coolant is typically already available, as the combustion engine itself is typically liquid-cooled. Furthermore, liquid lines are much more compact than the charge air lines and can be easily routed, and much more flexibility with regard to location of the charge air cooler is provided. In some cases, a liquid cooled charge air cooler can be placed at or near the air intake manifold of the engine, greatly simplifying the charge air routing over a directly air-cooled system.

However, the requirement that the heat be transferred twice using such an indirect system (first from the charge air to the liquid coolant, then from the liquid coolant to the ambient air) makes it more difficult to achieve the requisite low charge air temperature at the inlet of the combustion cylinders.

SUMMARY

According to an embodiment of the invention, a method of cooling a flow of charge air includes directing a flow of charge air through a first and a second stage of a charge air cooler in sequential order. A flow of liquid coolant is received, and is separated into a first portion and a second portion. The temperature of the first portion is reduced by rejecting heat to a refrigerant. The second portion is directed through the first stage of the charge air cooler in order to reduce the temperature of the charge air, and the first portion is directed through the second stage of the charge air cooler after having rejected heat to the refrigerant in order to further reduce the temperature of the charge air.

According to another embodiment of the invention, a charge air cooler includes a first, second, and third heat exchange sections. In the first heat exchange section, heat is transferred from a first flow of liquid coolant to a refrigerant in order to cool the first flow of liquid coolant from a first temperature to a second temperature. In the second heat exchange section, heat is transferred from a flow of charge air to a second flow of liquid coolant in order to cool the flow of charge air from a third temperature to a fourth temperature. In the third heat exchange section, heat is transferred from the flow of charge air to the first flow of liquid coolant in order to cool the flow of charge air from the fourth temperature to a fifth temperature, the fifth temperature being less than the first temperature.

According to yet another embodiment of the invention, a charge air cooler includes a first stack of plates joined to define alternating layers of liquid coolant passages and refrigerant passages, a second stack of plates joined to define alternating layers of liquid coolant passages and air flow passages, and a mounting plate arranged between the first and the second stack of plates. A first coolant inlet manifold extends through the first stack of plates and is fluidly coupled to inlet ends of the liquid coolant passages of the first stack, and a first coolant outlet manifold extends through the first stack of plates and is fluidly coupled to outlet ends of the liquid coolant passages of the first stack. A second coolant inlet manifold extends through the second stack of plates and is fluidly coupled to inlet ends of a first subset of the liquid coolant passages of the second stack. An aperture extends through the mounting plate, and provides a fluid communication pathway between the first coolant outlet manifold and the second coolant inlet manifold.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
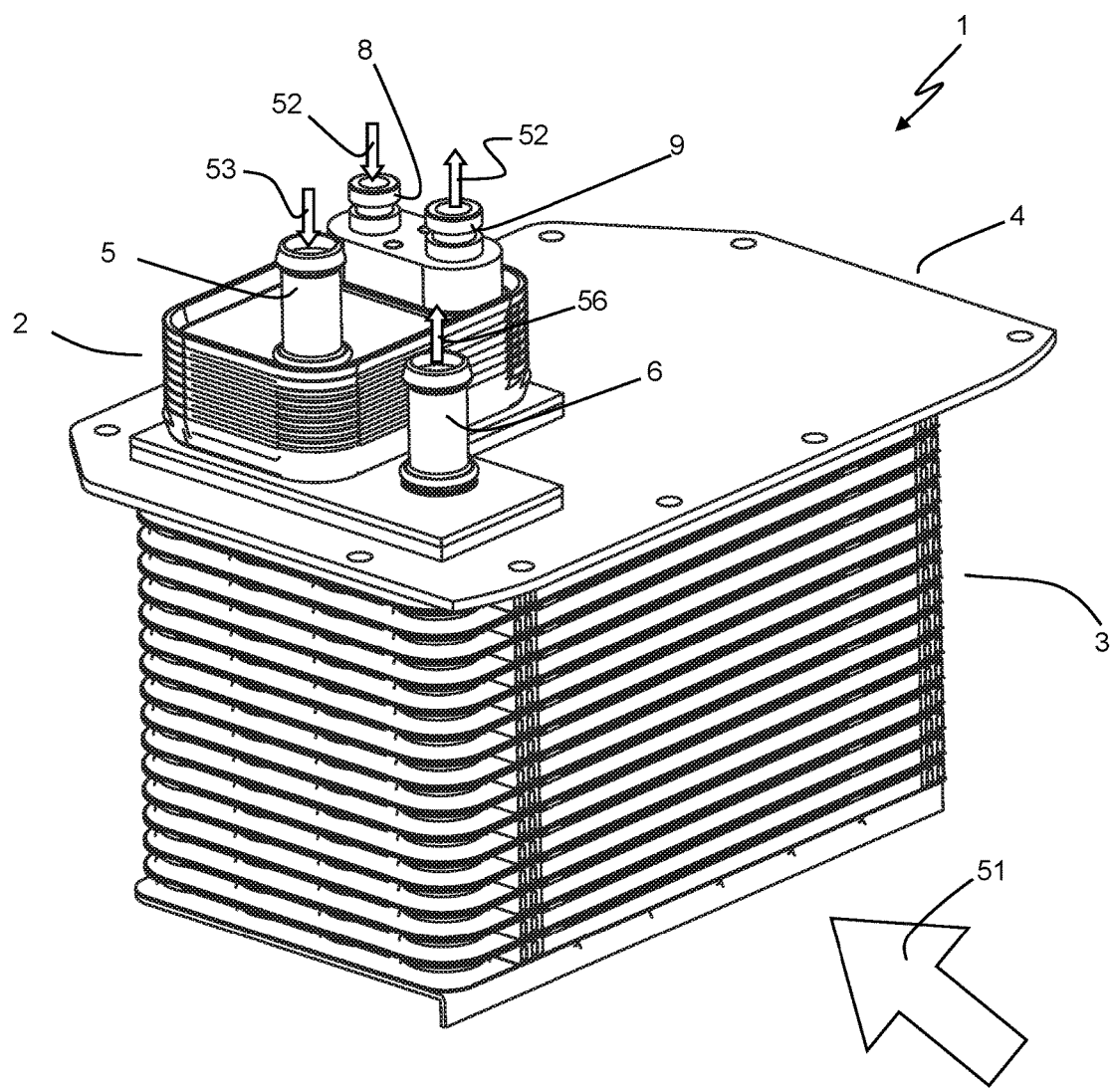
FIG. 1 is a perspective view of a charge air cooler according to an embodiment of the invention.
Figure 2:
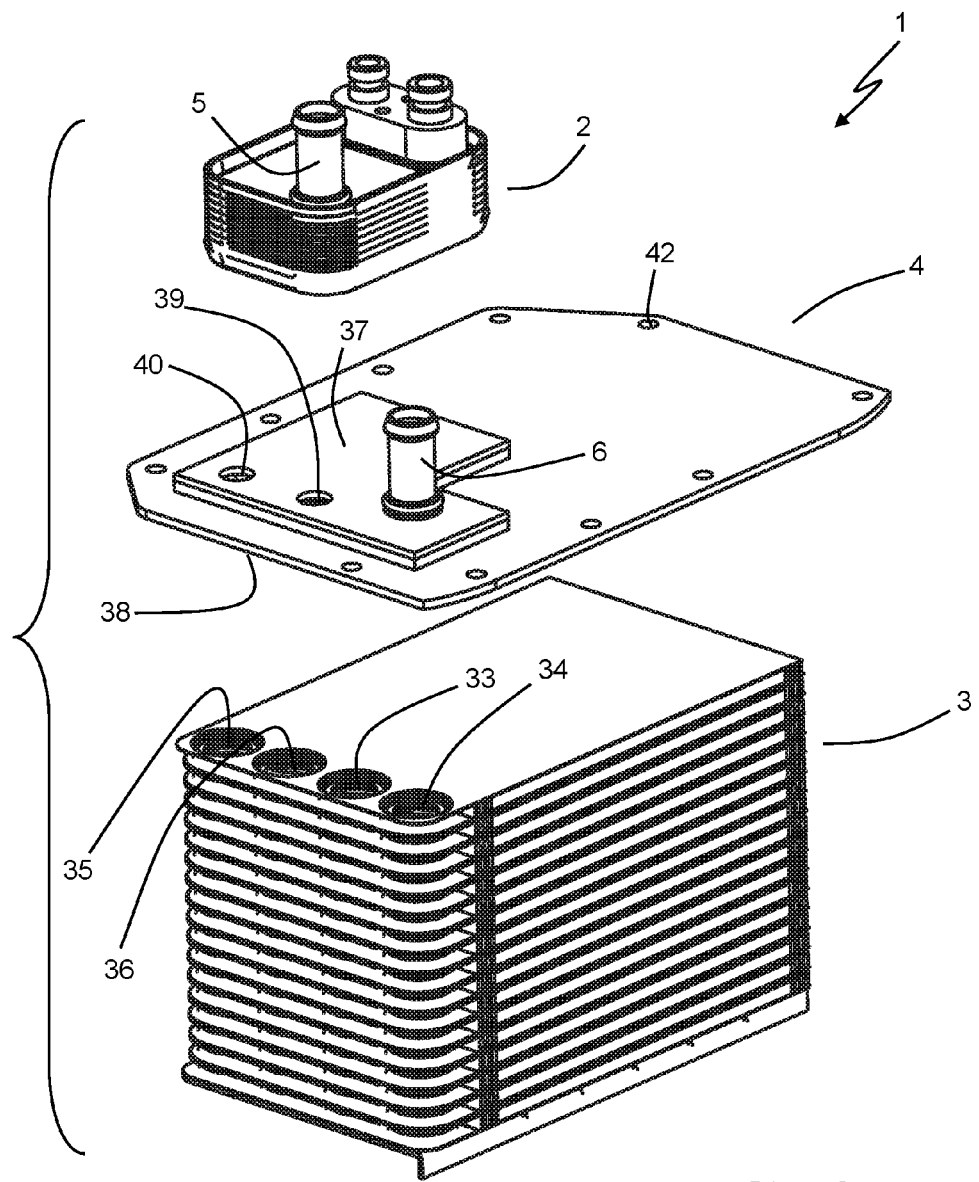
FIG. 2 is a partially exploded perspective view of the charge air cooler of FIG. 1.

A charge air cooler 1 depicted in FIGS. 1-2 is one exemplary embodiment of the present invention. The charge air cooler 1 can be used within an internal combustion engine system (as may be used, for example, in a vehicle or a stationary power generation system or the like) to reduce the temperature of a stream of compressed combustion air 51 prior to such air being received into the combustion chambers of the engine. Such compressed combustion air 51 is typically referred to as "charge air", and can be supplied to the charge air cooler 1 by a turbocharger, a supercharger, or any other device configured to compress ambient air for delivery to the engine.

In order to achieve the aforementioned cooling of the compressed combustion air 51, a flow of liquid coolant 53 is received into a coolant inlet port 5 of the charge air cooler 1 and is placed into heat exchange relation with the compressed air 51 traveling through the cooler 1. The liquid coolant 53 can be received from a closed loop of engine coolant that is used for cooling of the combustion engine and other heat-producing components within the engine. After heat from the compressed air 51 has been transferred to the coolant, the coolant is removed from the charge air cooler 1 through a coolant outlet port 6 as liquid coolant flow 56.

In a typical engine system of the type to which the charge air cooler 1 may be especially well-suited, the temperature of the liquid coolant flow 53 entering the charge air cooler 1 is often limited to a certain minimum by virtue of the fact that the heat from the closed loop of liquid coolant must itself be rejected, typically to the ambient air. In many cases, the temperature at which it is desirable for the compressed air to be supplied to the engine is lower than that minimum temperature, leading to undesirable results such as increased pollutant generation and/or decreased engine efficiency.

In order to address this shortcoming, the charge air cooler 1 is provided with a heat exchange section defined by a stack 2 of plates through which a portion of the liquid coolant flow 53 is directed. A flow of refrigerant 52 is received into this first stack 2 in an at least partially vapor state, and at a temperature that is lower than the temperature of the coolant 53 being received into the charge air cooler 1. The portion of the liquid coolant flow 53 that passes through the stack 2 is cooled by transferring heat to the flow of refrigerant 52 passing through the same section. In some especially preferable embodiments the flow of refrigerant 52 is received into the charge air cooler 1 at a temperature that is less than the ambient temperature of the system, thereby enabling the cooling of that portion of the liquid coolant flow 53 to a lower temperature than would be possible by heat rejection to the ambient air. The transfer of heat energy to the flow of refrigerant causes vaporization of the refrigerant 52, and the refrigerant 52 is subsequently removed from the charge air cooler 1 by way of a refrigerant outlet port 9 as a somewhat superheated vapor flow, or as a two-phase refrigerant flow at a higher vapor quality than that at which it was received into the charge air cooler 1.

The charge air cooler 1 further includes a liquid coolant to air heat exchange section defined by a second stack 3 of plates. Both the portion of the coolant flow 53 that is directed through the first stack 2 and the remaining portion of the coolant flow 53 are routed through the second stack 3 in order to cool the compressed charge air 51, as will be described in more detail with specific reference to FIG. 3.

In the exemplary embodiment of FIGS. 1 and 2, the stacks 2 and 3 are located on opposing sides of a mounting plate 4. The mounting plate 4 includes a first mounting surface 37 to which the stack 2 is affixed, and a second opposing mounting surface 38 to which the stack 3 is affixed. The footprint of the mounting plate 4 extends beyond the outer periphery of the stack 3, and a series of mounting holes 42 are arranged along the perimeter of the mounting plate 4. This allows for the stack 3 to be received within a housing (not shown) through which the flow of compressed charge air 51 can be directed, with the mounting plate 4 serving as a cover plate to seal off the housing. The locations of the mounting holes 42 can be arranged to coincide with the locations of corresponding mounting holes in such a housing, so that mechanical fasteners can be used to secure the mounting plate 4 to the housing in order to effect an air-tight seal. The housing can be a stand-alone housing for the charge air cooler 1, or can be a portion of the air intake manifold of the engine.

Figure 3:
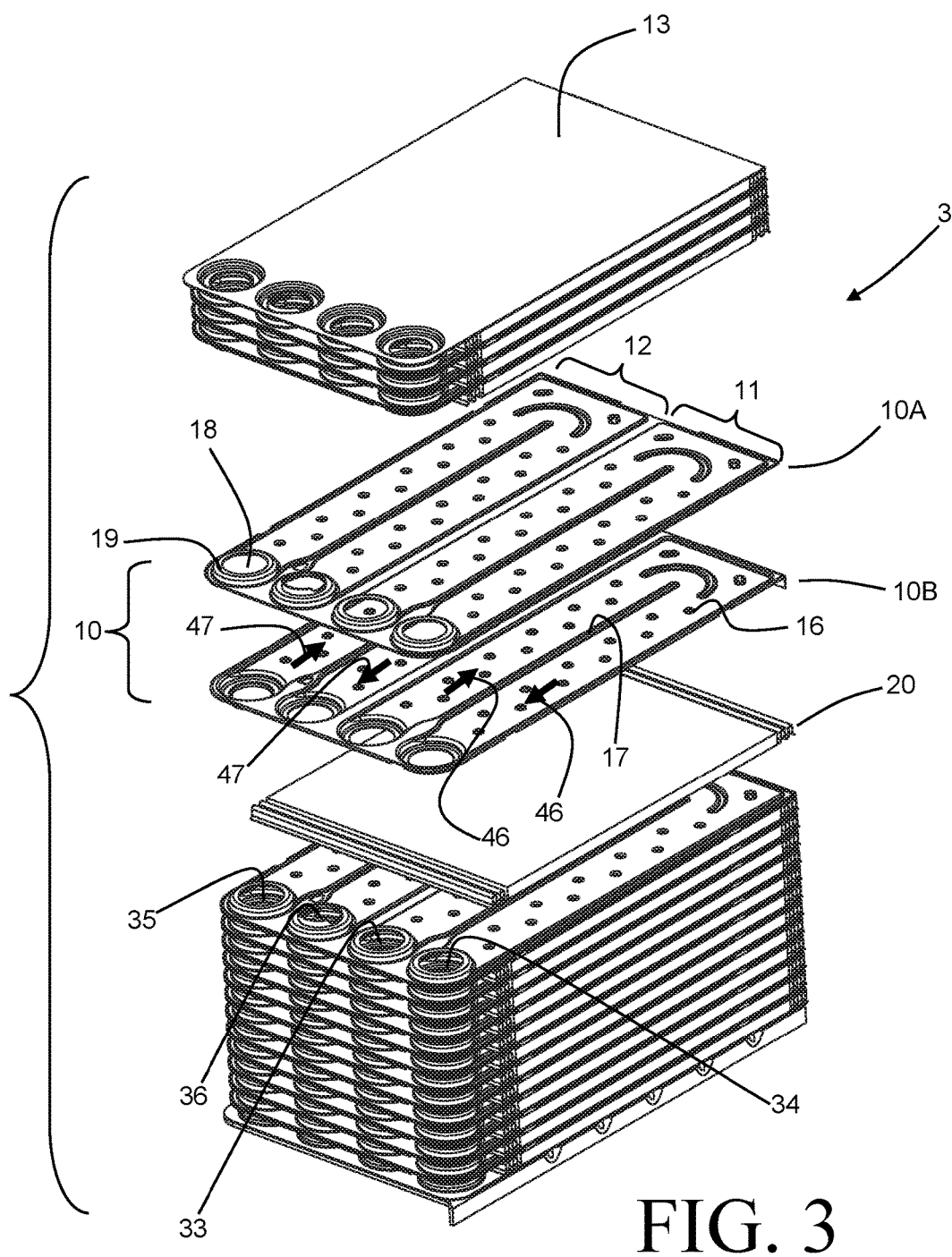
FIG. 3 is a partially exploded perspective view of a portion of the charge air cooler of FIG. 1.

The stack 3 of the charge air cooler 1 is shown in a partially exploded state in FIG. 3 in order to best illustrate certain aspects. The stack 3 is constructed as a stack of plate pairs 10, with each plate pair including generally mirror-image plates 10A, 10B which together define coolant flow paths 46, 47 within the plate pair. Corrugated air fins 20 are interlaced between the plate pairs 10 and are joined thereto. Note that, while only a few convolutions of the corrugated air fins are shown at each end of each fin 20, the corrugations are intended to continue over the entire width of the air fins 20 in order to provide air flow channels through charge air cooler 1, as well as extended surface area for heat transfer from the air. The air fins 20 can optionally be provided with louvers, bumps, slits, or other turbulation features in order to improve the rate of convective heat transfer from the flow of air 51.

The plates 10A,B and the air fins 22 are preferably constructed of a brazeable metal such as, for example, aluminum. This allows for reliable joining of the stack components in a brazing operation, thereby both ensuring leak-free separation of the liquid coolant and the air and providing low thermal resistance for the efficient exchange of heat between the fluids.

The plate pairs 10 define two separate heat exchange sections 11 and 12 for the transfer of heat from the compressed air 51 to the liquid coolant. The sections 11 and 12 are arranged so that the compressed air 51 is directed through them sequentially, with the section 11 arranged upstream of the section 12 with respect to the flow of the charge air 51. The section 11 provides coolant flow paths 46 extending between a coolant inlet manifold 33 and a coolant outlet manifold 34. Similarly, the section 12 provides coolant flow paths 47 extending between a coolant inlet manifold 35 and a coolant outlet manifold 36. In the exemplary embodiment, the coolant flow paths 46 and 47 each include two successive passes extending in a transverse direction to the flow of air 51, with the passes arranged so that the first coolant pass is downstream of the second coolant pass with respect to the airflow (in other words, counter-cross-flow arrangement between the coolant and the air). In other embodiments, one or both of the flow paths can have more or fewer passes, and/or can have the passes arranged so that later passes are downstream of earlier passes.

The manifolds 33, 34, 35, 36 are defined by holes 18 in each of the plates 10A and 10B, with domed perimeters 19 of the holes 18 extending away from the interior of each plate pair 10. The domed perimeters 19 are of a height that is approximately half of the height of the air fins 20, so that the domed perimeters 19 of adjacent plate pairs 10 abut one another in order to fluidly seal the manifolds. Elongated ribs 17 are formed into the plates 10A and 10B towards the interiors of the plate pairs 10 in order to define the successive passes within each plate pair 10. Dimples 16 are also provided, and serve to both turbulate the flow of coolant for enhanced heat transfer and to provide structural support for the plate pairs 10. A top plate 13 is arranged at one end of the plate stack, and is joined to the mounting surface 38 of the mounting plate 4. A bottom plate 14 is arranged at the opposing end of the plate stack, and caps the manifolds 33, 34, 35, 36. The bottom plate 14 can be provided with a perpendicularly oriented flange 15 to assist with the assembly of the section 3 into a housing.

Figure 4:
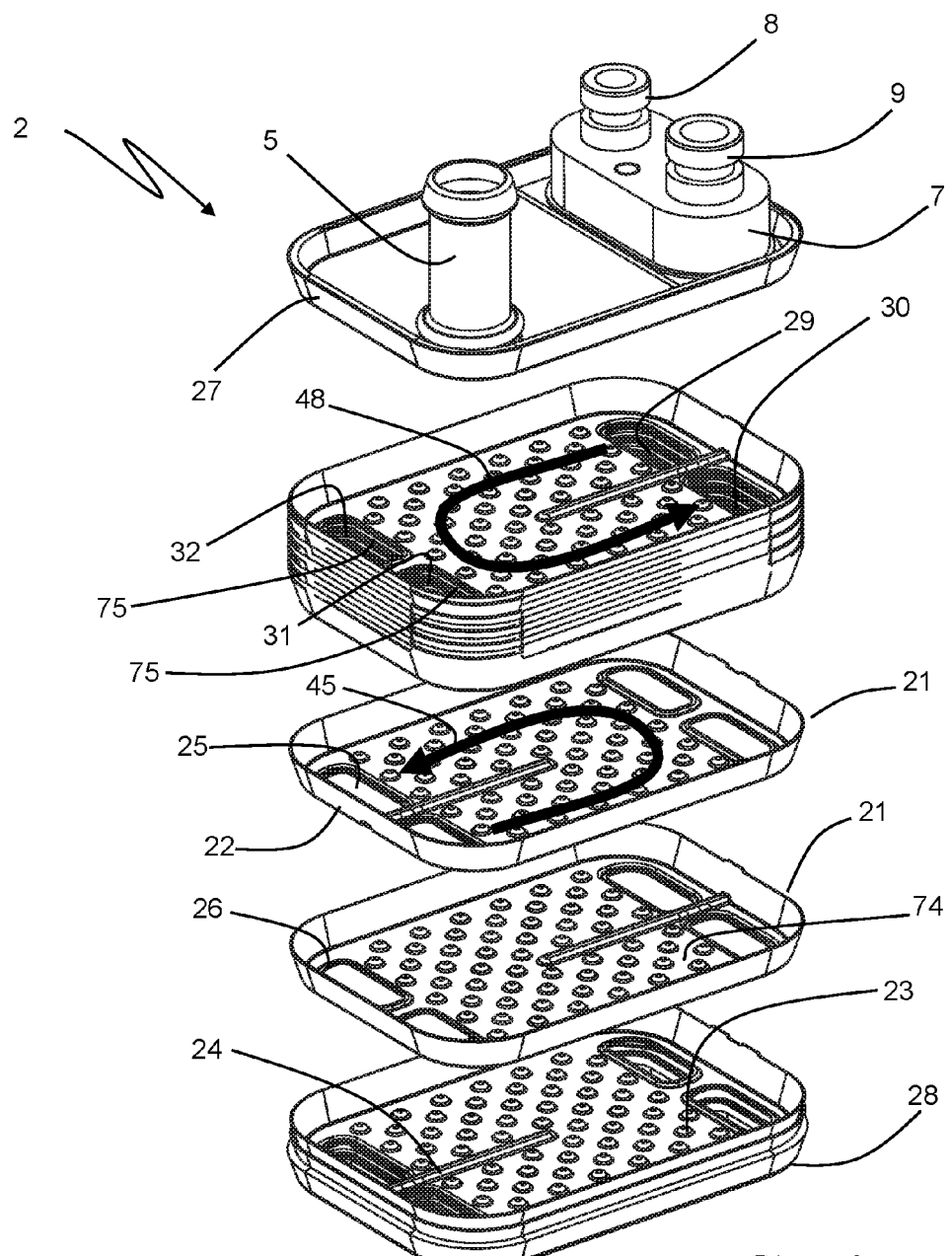
FIG. 4 is a partially exploded perspective view of another portion of the charge air cooler of FIG. 1.

The refrigerant to liquid coolant stack 2 of the charge air cooler 1 is shown in a partially exploded state in FIG. 4 in order to best illustrate certain aspects. This portion of the charge air cooler 1 is constructed as a stack of plates 21 which nest together to form the plate stack 2. The nesting behavior occurs as a result of an angled peripheral flange 22 extending along the perimeter of each of the plates 21, such that the flanges 22 of adjacent plates 21 overlap and abut one another when the stack is assembled. As with the stack 3, the plates 21 are preferably constructed of a brazeable metal such as aluminum so that the assembled stack 2 can be brazed to form leak-free joints between the nested plates 21.

A single plate design can be used to provide flow paths for both the liquid coolant and the refrigerant passing through the stack 2, as shown in the embodiment of FIG. 4. Flow paths 48 for the refrigerant and flow paths 45 for the liquid coolant are provided on alternating layers of the stack 2. A refrigerant inlet manifold 29 and a refrigerant outlet manifold 30 are both provided at one end of the stack 2, in locations corresponding to a refrigerant inlet port 8 and a refrigerant outlet port 9 respectively. The refrigerant ports 8 and 9 each extend from a refrigerant fitting 7 arranged at the top of the stack 2, such a refrigerant fitting 7 preferably being of a standard type to facilitate the integration of the charge air cooler 1 into a standard refrigerant system. The refrigerant flow paths 48 include two successive passes extending in a U-shape on each of the refrigerant layers. Similarly, a liquid coolant inlet manifold 31 and a liquid coolant outlet manifold 32 are provided at the opposing end of the stack 2. The location of the coolant inlet manifold 31 corresponds to the location of the coolant inlet port 5 so that at least some of the coolant received into the charge air cooler 1 through the coolant inlet port 5 can be directed into the coolant flow paths 45. The coolant flow paths 45 also include two successive passes extending in a U-shape on each of the coolant layers.

As the individual plates 21 are assembled into the stack 2, the angled peripheral flanges 22 engage so that the generally planar and flat central surfaces 74 of the plates 21 are spaced apart to define the flow paths 45, 48. Dimples 23 can be provided over the surface 74 to bridge the resulting gap in order to provide both structural support and turbulation of the flow. Alternatively, separate turbulator sheets can be provided within the space. A central rib 24 is similarly provided in order to define the U-shaped flow paths and to prevent the direct transfer of coolant from the inlet manifold 31 to the outlet manifold 32, or of refrigerant from the inlet manifold 29 to the outlet manifold 30.

The manifolds 29, 30, 31, 32 are each defined by holes 25 provided at the corners of each of the plates 21. Each of the holes 25 is bounded by an embossed peripheral flange 26 having a height that is approximately equal to half of the space between adjacent plates 21. Two of the peripheral flanges 26 surrounding the holes 25 at the end of each plate 21 extend from the surface 74 in one direction, while the other two of the peripheral flanges extend from the surface 74 in the opposing direction. Alternating ones of the plates 21 in the stack 2 are rotated 180 degrees so that the two upwardly extending peripheral flanges 26 of a plate 21 can engage the two downwardly facing peripheral flanges 26 of a first adjacent plate 21, and so that the two downwardly extending peripheral flanges 26 of a plate 21 can engage the two upwardly extending peripheral flanges 26 of a second adjacent plate 21. Each central rib 24 extends from the surface 74 in opposite direction to that of the peripheral flanges 26 surrounding those holes 25 that are separated by the rib 24, so that apertures 75 are defined within each of the manifolds 29, 30, 31, 32 to allow for the fluids to pass into and out of the flow passages 45, 48.

Although the use of a common plate 21 can provide economic benefits, it should be understood that in some alternative embodiments two different plate designs can be assembled in alternating fashion to form the plate stack 2. In addition, alternative plate stack designs, such as for example a clinched plate design, can be used in lieu of the nested plate design shown in the exemplary embodiment.

The plate stack 2 is capped on one end by a top plate 27, which is constructed of a thicker material than that of the plates 21 in order to better withstand the pressure forces imposed on it by the refrigerant. The refrigerant fitting 7 is affixed to the top plate 27, as is the liquid coolant inlet port 5. A bottom plate 28 caps the plate stack 2 at the opposing end, and is similarly constructed of a thicker material. The bottom plate 28 can be used to close off the refrigerant manifolds 29 and 30, and provides the interface by which the plate stack 2 is joined to the mounting surface 37 of the mounting plate 4.

Figure 5:
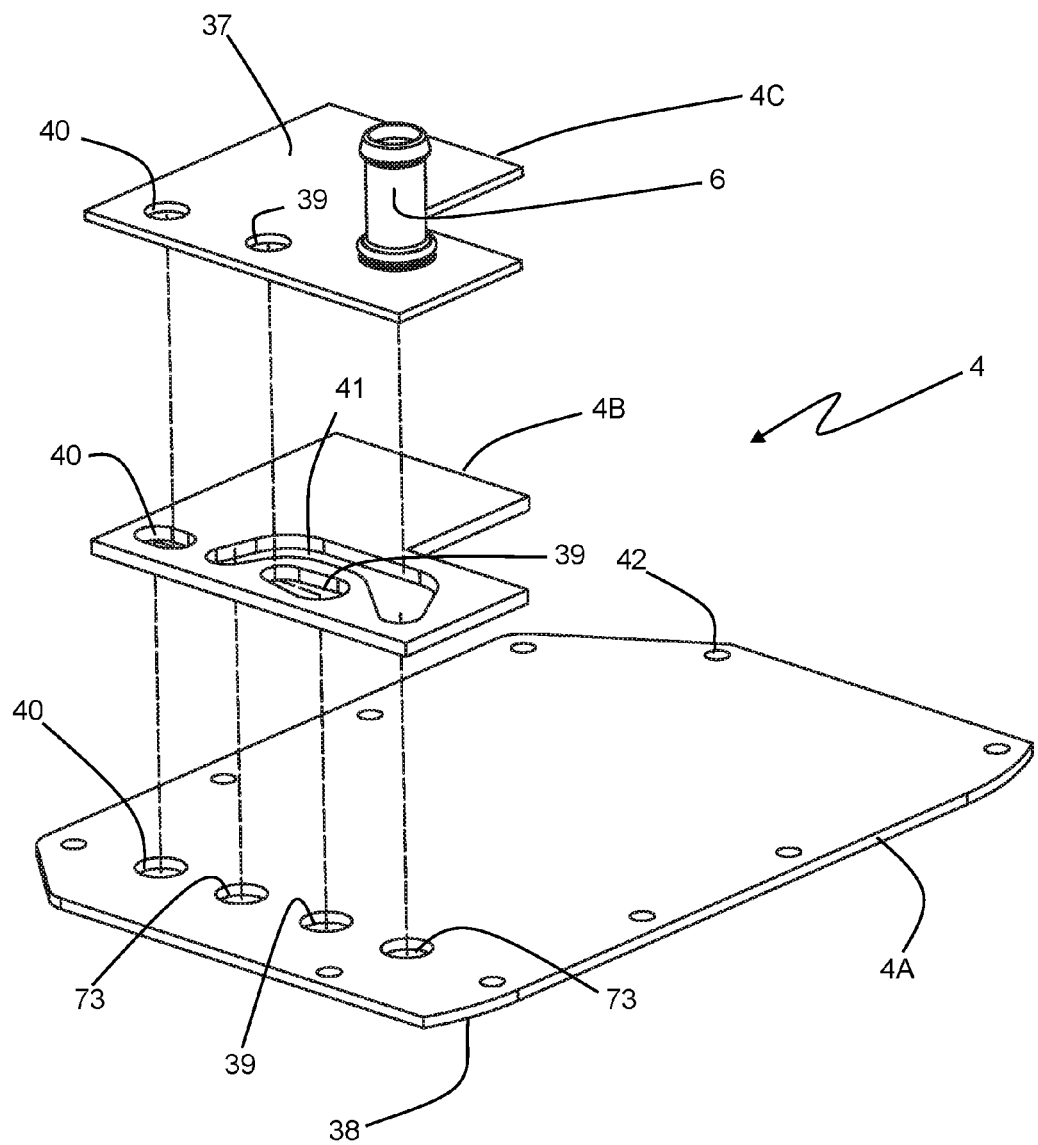
FIG. 5 is a partially exploded perspective view of yet another portion of the charge air cooler of FIG. 1.
Figure 6:
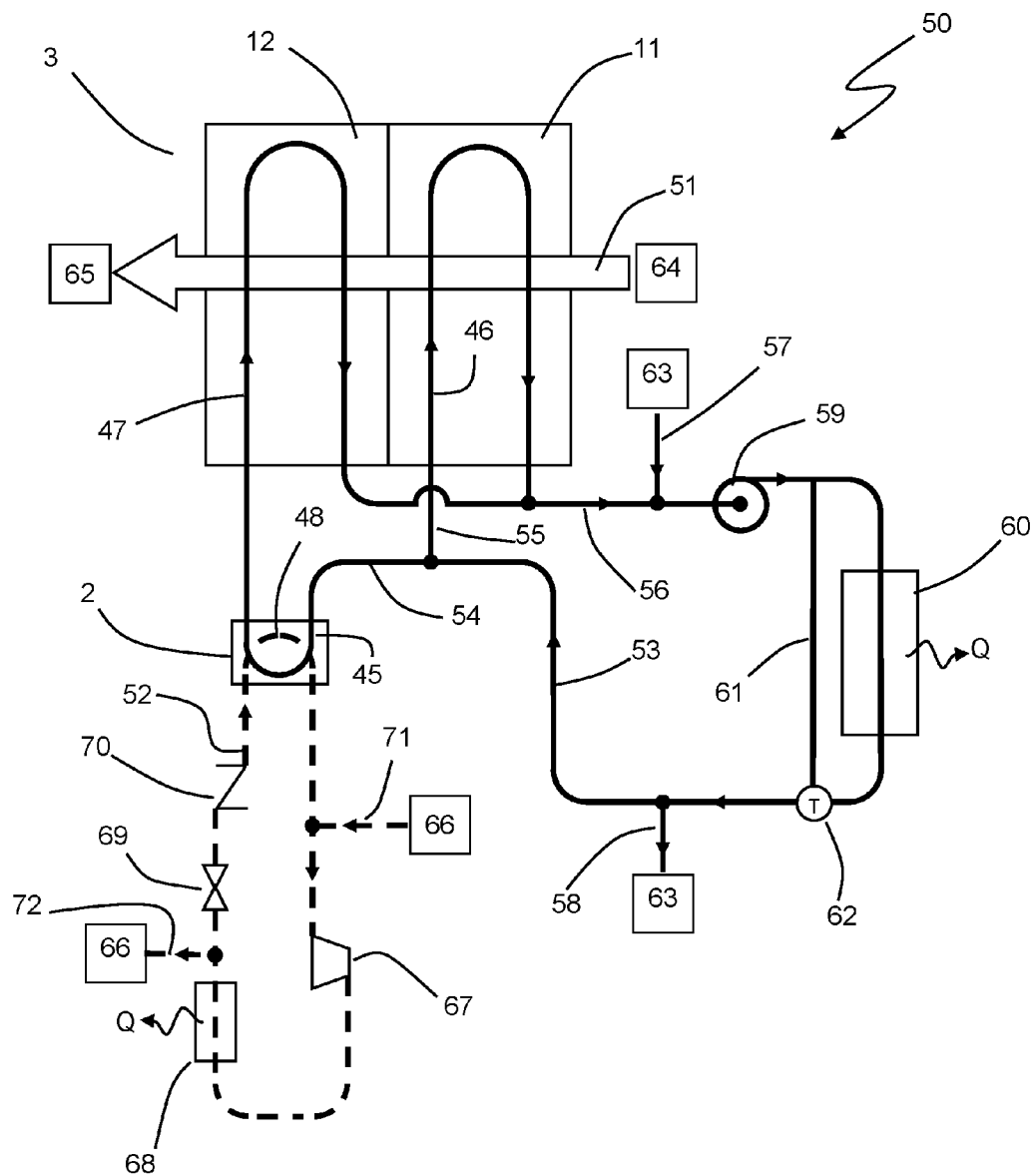
FIG. 6 is a schematic of a charge air cooler system embodying the present invention, within an internal combustion engine system.

The mounting plate 4, as shown in the exploded view of FIG. 5, can be constructed of several plate components. Specifically for the exemplary embodiment, three flat plates 4A, 4B, and 4C are employed, and are laminated together to form the mounting plate 4. This construction allows for the use of flat parts which can be readily formed out of sheet material. It should be understood, though, that more or fewer plate parts can be used, and in some embodiments the mounting plate 4 can be formed as a single part.

An aperture 39 extends through the entire thickness of the mounting plate 4, from the mounting surface 37 to the mounting surface 38. At the mounting surface 37 the aperture 39 is of a size and position that corresponds to the coolant inlet manifold 31 of the plate stack 2. The manifold 31 extends through the bottom plate 28 of the plate stack 2, so that at least a portion of the liquid coolant supplied into the coolant inlet manifold 31 can be directed into the aperture 39 instead of passing along the coolant flow paths 45 of the stack 2. At the mounting surface 38 the aperture 39 is of a size and position that corresponds to the coolant inlet manifold 33 of the plate stack 3, so that coolant directed into the aperture 39 from the coolant inlet manifold 31 of the plate stack 2 can be received into the manifold 33.

It should be readily apparent from FIG. 5 that the multi-piece design of the mounting plate 4 allows the aperture 39 to extend through the mounting plate 4 along a non-linear path. This enables the location and/or the size of the aperture 39 at the mounting surface 38 to be different from the location and/or size at the mounting surface 37, and therefore allows for greater flexibility in the design of the stacks 2 and 3.

An aperture 40 similarly extends through the mounting plate 4 from the mounting surface 37 to the mounting surface 38. At the mounting surface 37 the aperture 40 is of a size and position that corresponds to the coolant outlet manifold 32 of the plate stack 2, and at the mounting surface 38 the aperture 40 is of a size and position that corresponds to the coolant inlet manifold 35 of the plate stack 3. The manifold 32 also extends through the bottom plate 28 of the plate stack 2, so that the liquid coolant that has passed along the flow paths 45 of the plate stack 2 is directed from the coolant outlet manifold 32 to the coolant inlet manifold 35 by way of the aperture 40. Again, the multi-piece design of the mounting plate 4 enables the location and/or the size of the aperture 40 at the mounting surface 38 to be different from the location and/or size at the mounting surface 37.

The plate component 4A also has two additional apertures 73 which do not extend completely through the mounting plate 4. The apertures 73 are aligned with the coolant outlet manifolds 34 and 36 of the plate stack 3 so that the liquid coolant can be received therethrough after having passed through the plate pairs 10. The liquid coolant from those manifolds is recombined in an internal channel 41 of the mounting plate 4, and the coolant outlet port 6 is in fluid communication with the channel 41 so that the combined coolant can be removed from the charge air cooler 1 through that port 6.

In an alternative embodiment of the charge air cooler 1, only a single aperture 73 aligned with the coolant outlet manifold 34 is provided. Communicating pathways are provided within the plate stack 3 between the coolant outlet manifold 36 and the coolant inlet manifold 33, so that coolant that has passed through the heat exchange section 12 is subsequently received into the coolant inlet manifold 33, where it is recombined with coolant received through the aperture 39 and passes through the heat exchange section 11.

The multiple components of the mounting plate 4 can be constructed of a brazeable metal such as aluminum, so that the various components can be joined by way of a brazing operation to form the mounting plate 4. In some highly preferable embodiments, components of the stack 2, the stack 3, and the mounting plate 4 are all formed from similar or compatible brazeable materials, and can be brazed together to form the charge air cooler 1 in a single brazing operation.

A method of cooling a flow of charge air according to an embodiment of the invention will now be described in detail with reference to FIG. 8. A charge air cooling system 50 includes a first heat exchange section 11 and a second heat exchange section 12 through which the flow of charge air 51 passes sequentially. The flow of charge air 51 is received from an air compression device 64 such as, for example, a turbocharger or a supercharger. After having been cooled in the heat exchange sections 11 and 12, the charge air 51 is delivered to combustion cylinders 65. The heat exchange section 11 and 12 are provided as an air to coolant heat exchanger 3.

A flow of liquid coolant 53 is received from a coolant pump 59, and is separated into a first portion 54 and a second portion 55. The first portion 54 is directed through a liquid to refrigerant heat exchanger 2 along a flow path 45, and is reduced in temperature by rejecting heat to a flow of refrigerant directed through the heat exchanger 2 along a flow path 48.

The second portion 55 of the flow of liquid coolant is directed through the heat exchange section 11 along a flow path 46 and receives heat from the flow of charge air 51. The first portion 54 of the liquid coolant flow, having been cooled by the transfer of heat to the refrigerant in the heat exchanger 2, is directed through the heat exchange section 12 along a flow path 47 and receives heat from the flow of charge air 51, which has already passed through the heat exchange section 11 and has been cooled by the transfer of heat to the second portion 55 of the liquid coolant. The first portion 54 of the liquid coolant flow and the second portion 55 of the liquid coolant flow are recombined to form a combined coolant flow 56.

Although the coolant flow 53 used in the system 50 can be a dedicated coolant loop, it is more preferably a part of the coolant loop for the entire engine cooling system with which the charge air cooling system 50 is associated. The coolant flow 56 is received from the heat exchanger 3 and is combined with additional coolant 57 from an engine cooling system 63 on the suction side of the coolant pump 59 which circulates the coolant flow. Heat received into the coolant in the heat exchange section 3 and in the engine cooling system 63 is rejected to ambient in a radiator 60. A thermostat 62 is arranged downstream of the radiator 60, and can regulate the temperature of the coolant flow by bypassing a portion of the coolant around the radiator 60 through a bypass 61. Such temperature regulation can be used to ensure that coolant is delivered to the engine cooling system 63 at an optimal temperature. A portion 58 of the coolant flow is directed to the engine cooling system 63, with the remaining portion 53 of the coolant flow being returned to the charge air cooling system 50.

In some embodiments the flow 53 can be part of a low temperature coolant loop that rejects additional heat to ambient air in a low temperature radiator. Even in such cases, though, the temperature of the coolant 53 is no lower than the ambient temperature.

The refrigerant that passes through the heat exchanger 2 along the refrigerant flow path 48 preferably exits the heat exchanger 2 in a superheated vapor state. This refrigerant is subsequently combined with additional vapor phase refrigerant 71 received from an additional portion 66 of the refrigerant system. The additional portion 66 of the refrigerant system can be, for example, an under-dash climate conditioning system for passenger comfort cooling. The combined vapor refrigerant flow is received into a refrigerant compressor 67, wherein it is compressed to a high-pressure vapor state. The high-pressure vapor is then cooled and condensed to a high-pressure liquid state in a condenser 68. In some embodiments the condenser 68 is an air-cooled condenser, whereas in other embodiments the condenser 68 is part of the engine cooling system 63 and cools and condenses the refrigerant by transferring heat to the liquid coolant 58.

A portion 72 of the cooled and condensed liquid refrigerant is returned to the portion 66 of the refrigerant system while the remaining portion 52 is directed back to the charge air cooling system 50. The flow of refrigerant 52 is expanded to a low-pressure two-phase flow in expansion valve 69, and is delivered to the heat exchanger 2 in that state. An optional shut-off valve 70 can be arranged upstream or downstream of the expansion valve 69.

The expansion of the refrigerant flow 52 in the expansion valve 69 reduces the temperature of the refrigerant substantially, and makes it very feasible for the refrigerant 52 to be vaporized as it passes along the flow path 48 at a temperature that is substantially lower than the ambient temperature. As a result, the portion 54 of the liquid coolant flow can be cooled by the refrigerant to a temperature that is lower than ambient, and can subsequently cool the charge air 51 to a lower temperature than could be achieved with either a conventional liquid coolant loop or through direct cooling by ambient air. In the system 50 as described, the charge air can be received into the heat exchange section 11 from the air compression device at an elevated first temperature and can be delivered to the combustion cylinders 65 at a greatly reduced second temperature, even though the temperature of the flow of liquid coolant 53 that is received by the charge-air cooling system 50 is between the first and second temperatures.

The optional shut-off valve 70 can be used to prevent the flow of refrigerant through the refrigerant flow path 48 under certain operating conditions. As an example, in certain operating conditions the ambient air temperature may be sufficiently low to enable adequate cooling of the compressed charge air 51 by the liquid coolant at the temperature at which it enters the charge air cooling system 50. Under such operating conditions, there would be little or no benefit gained by using refrigerant to further cool the liquid coolant. Such additional cooling could actually be detrimental to the operating efficiency of the engine system, as the load placed upon the refrigerant compressor 67 would be needlessly increased. Through the closing of the valve 70, any refrigerant exiting the condenser 68 would be directed towards the remaining portion 66 of the refrigerant system. The first portion 54 of the liquid coolant flow would, however, still be available for cooling of the charge air in the heat exchange section 12, as it would simply pass through the heat exchanger 2 without any increase or decrease of temperature.

Figure 7:
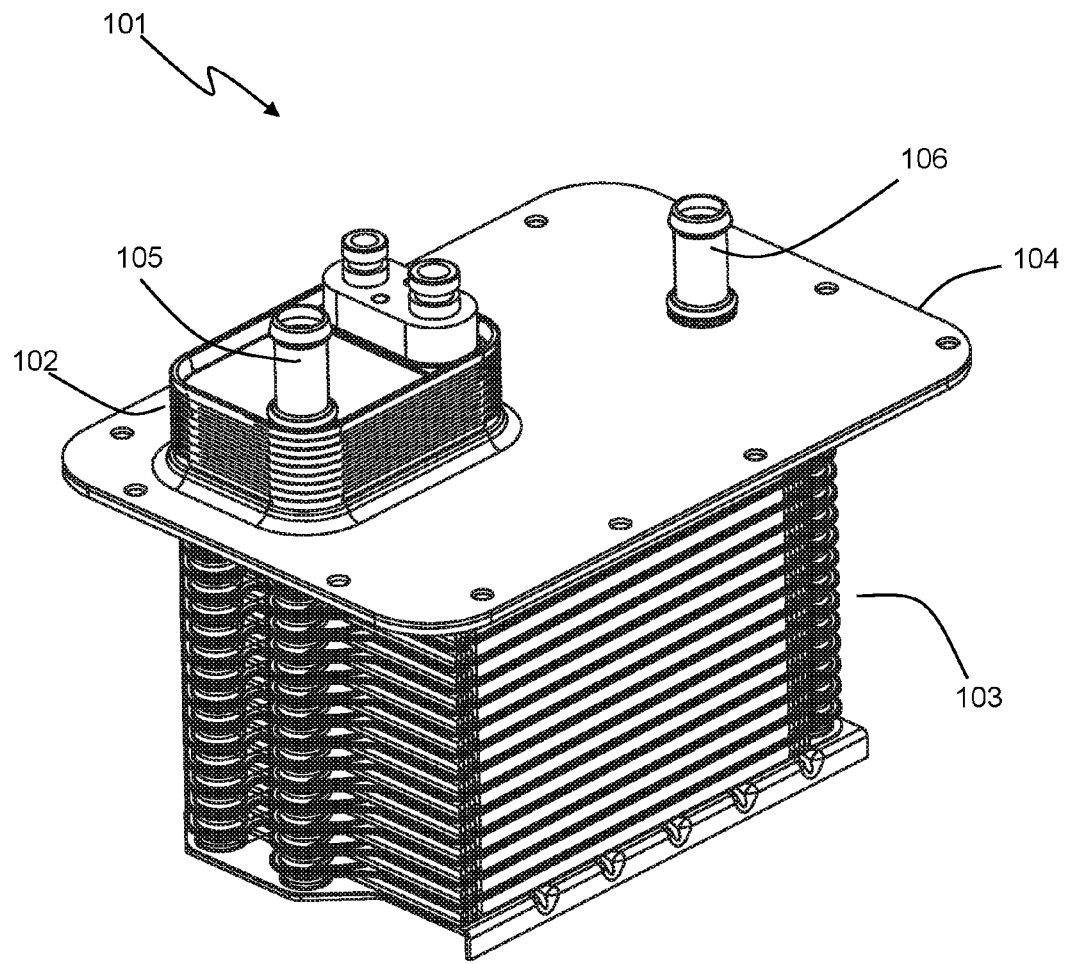
FIG. 7 is a perspective view of a charge air cooler according to another embodiment of the invention.
Figure 8:
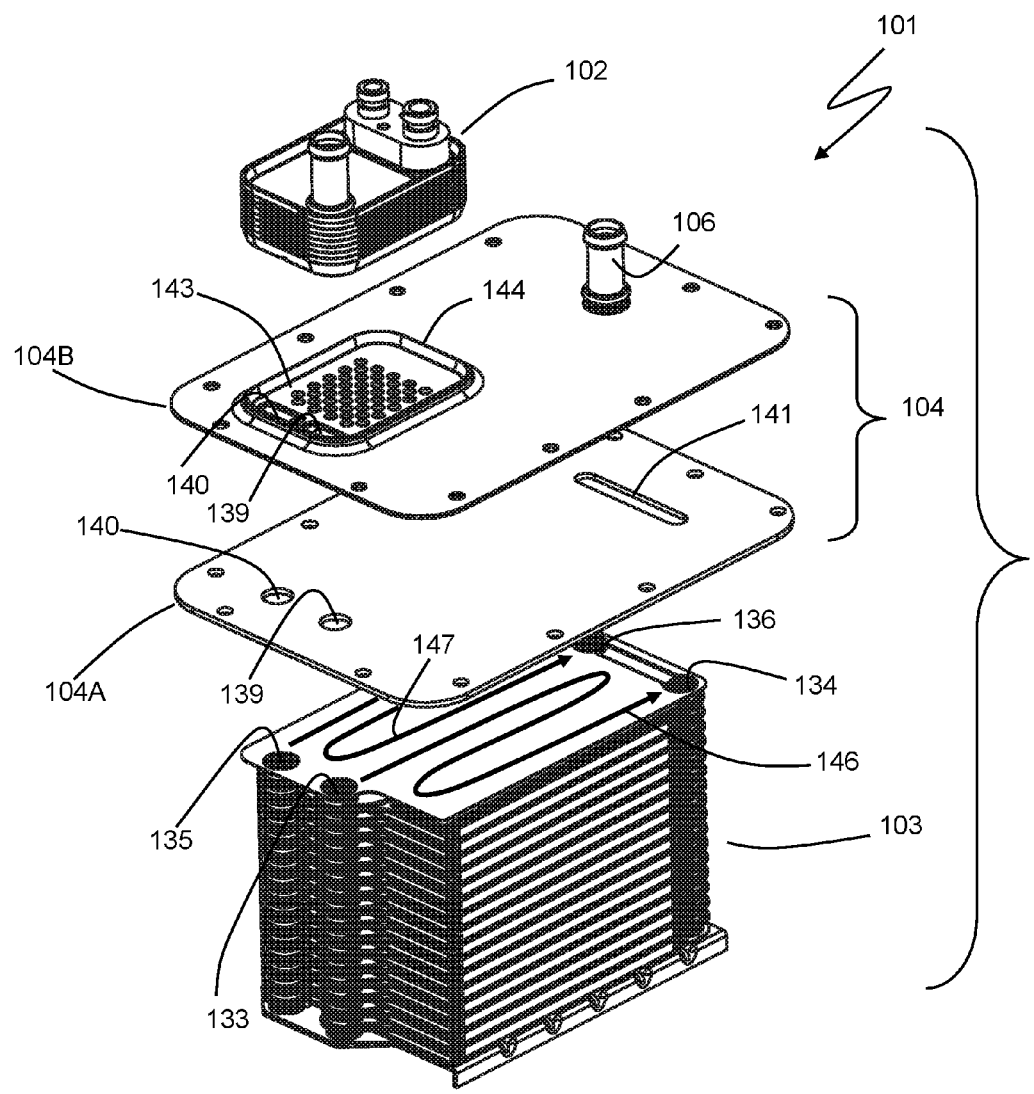
FIG. 8 is a partially exploded perspective view of the charge air cooler of FIG. 7.

An alternative embodiment 101 of a charge air cooler according to the present invention is shown in FIGS. 7-8. Many of the features shown in this embodiment are similar in nature to those of the earlier described embodiment, and will not be described again.

The charge air cooler 101 again includes a liquid coolant to refrigerant heat exchange section embodied as a stack of plates 102 and a liquid coolant to charge air heat exchange section embodied as a stack of plates 103. The stack 102 and the stack 103 are joined to opposing sides of a mounting plate 104. The mounting plate 104 is again constructed as a multi-piece plate, but in this case is constructed of two parts 104A and 104B. The part 104B is provided with a mounting surface 143 that takes the place of the bottom plate for the stack 102, with a surrounding raised flange portion 144 to provide the desired structural support the stack 102.

The coolant flow passages 146 and 147 of the stack 103 are similar to the flow passages 46 and 47 described in the previous embodiment with respect to the stack 3, with the exception that the passages 146 and 147 each encompass an odd number (specifically, three) of flow passes through the stack 103. As a result, the coolant outlet manifolds 134 and 136 are located at opposing ends of the stack 103 from the coolant inlet manifolds 133 and 135. The inlet manifold 133 is in fluid communication with the coolant inlet port 105 so that, similar to the previously described embodiment, a portion of the liquid coolant received into the charge air cooler 101 through the coolant inlet port 105 can be received into the inlet manifold 133 without passing through the coolant to refrigerant section 102. The remainder of the liquid coolant passes through the section 102 and is cooled by the refrigerant therein, and is subsequently delivered to the coolant to charge air heat exchange section 103 through the inlet manifold 135. Apertures 139 and 140 extend through the mounting plate 104 to enable this routing of the liquid coolant between the stacks 102, 103.

As the coolant outlet manifolds 134 and 136 are arranged at the opposing end of the stack 103 from the inlet manifolds 133 and 135, the coolant outlet port 106 is similarly located at the opposing end from the coolant inlet port 105. An internal slot 141 is provided within the mounting plate 104 to allow for the two streams of liquid coolant to be rejoined, and the combined coolant flow is removed from the charge air cooler 101 through the outlet port 106 which is joined to the mounting plate 104 and is in fluid communication with the slot 141.

Figure 9:
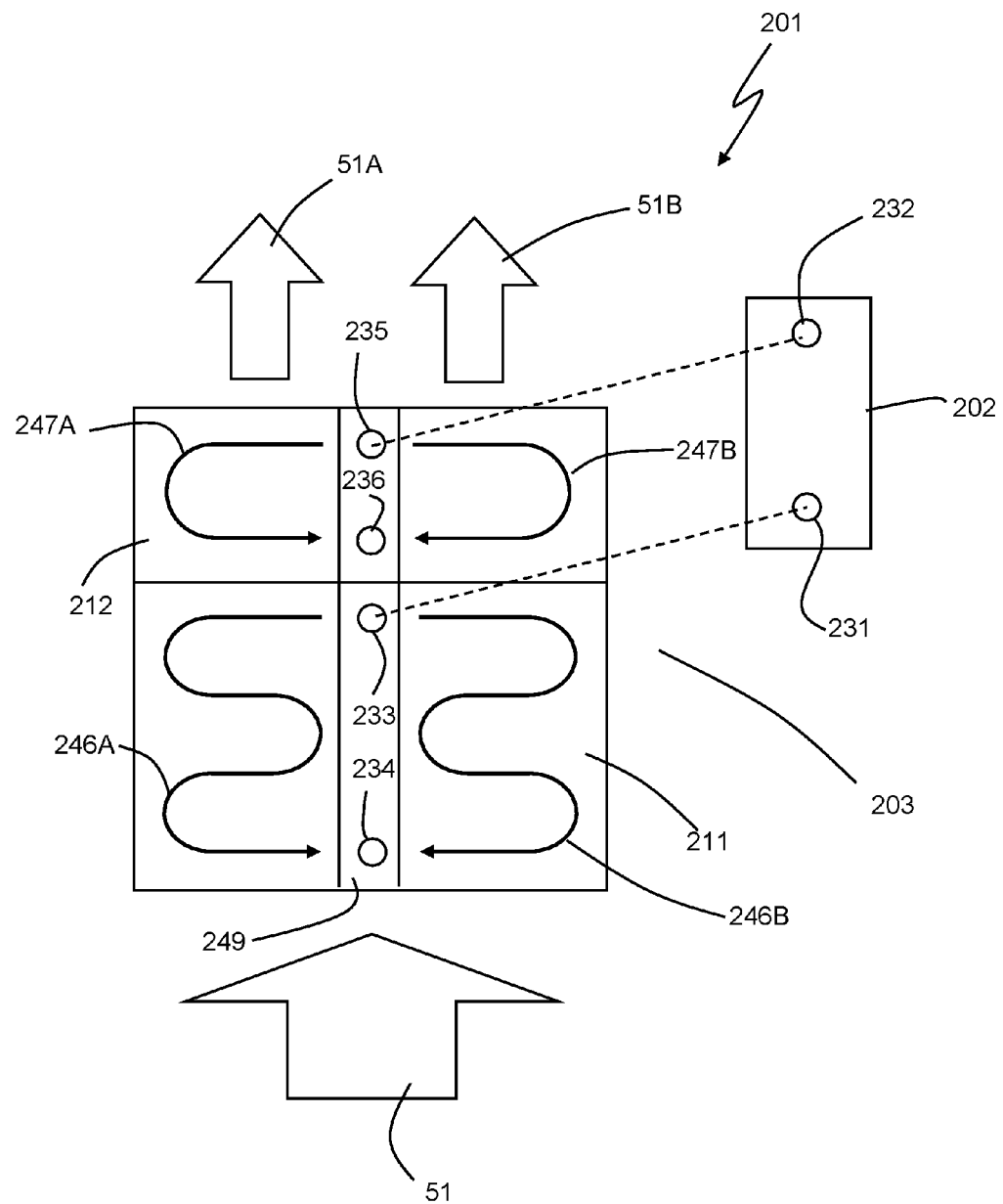
FIG. 9 is a diagrammatic view of a charge air cooler according to yet another embodiment of the invention.

Yet another embodiment of the invention is shown in diagrammatic form in FIG. 9. The charge air cooler 201 operates similarly in principle to the charge air coolers 1 and 101, but also includes a split-flow coolant configuration that has previously been described by the applicant in U.S. Pat. No. 9,038,609, the entire contents of which are hereby incorporated herein by reference.

In the charge air cooler 201, the coolant to refrigerant heat exchange section 203 includes a centrally located portion 249 that blocks the flow of charge air. As a result, the flow of incoming compressed charge air 51 is split into two portions 51A and 51B, which independently pass through the heat exchanger section 103 before being rejoined. In similar fashion to the previously described embodiments, the liquid coolant to charge air heat exchange section 103 includes a first portion 211 for cooling the incoming charge air using a first flow of the liquid coolant, and a subsequent second portion 212 for further cooling the charge air using a second flow of the liquid coolant.

Both flows of the liquid coolant are received together into the charge air cooler 201 by way of a liquid coolant inlet manifold 231 provided within a liquid coolant to refrigerant heat exchange section 202 of the charge air cooler 201. The first and second flows of liquid coolant are split off from one another in that manifold 231, with the first flow being directed into a liquid inlet manifold 233 of the heat exchange section 203, and the second flow passing through the heat exchange section 202 to be cooled by refrigerant passing therethrough (not shown) and subsequently being directed from an outlet manifold 232 of the heat exchange section 202 into a liquid inlet manifold 235 of the heat exchange section 203. Both the inlet manifold 233 and the inlet manifold 235 are arranged within the centrally located portion 249.

The first flow of liquid coolant is split into fluidly parallel coolant flow paths 246A and 246B arranged on opposing sides of the centrally located portion 249, so that coolant flowing along the flow path 246A receives heat from the compressed charge air portion 51A and the coolant flowing along the flow path 246B receives heat from the compressed charge air portion 51B. Each of the coolant flow paths 246A,B includes an even number of flow passes oriented transversely to the direction of the charge air, and terminates at a coolant outlet manifold 234 that is again arranged within the centrally located portion 249.

In a similar manner, the second flow of liquid coolant is split into fluidly parallel coolant flow paths 247A and 247B arranged on opposing sides of the centrally located portion 249, so that coolant flowing along the flow path 247A receives heat from the compressed charge air portion 51A and the coolant flowing along the flow path 247B receives heat from the compressed charge air portion 51B. Each of the coolant flow paths 247A,B also includes an even number of flow passes oriented transversely to the direction of the charge air, and terminates at a coolant outlet manifold 236 that is again arranged within the centrally located portion 249.

In especially preferable embodiments, the multiple passes by which the coolant flows pass through the heat exchange section 103 are arranged so that successive passes are located upstream of previous passes with respect to the direction of the charge air (i.e. counter-cross-flow orientation between the fluids), as shown in FIG. 9. However, in some embodiments either the coolant flow passages 247A,B or the coolant flow passages 246A,B or both can instead be arranged so that successive passes are located downstream of previous passes with respect to the direction of the charge air.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A method of cooling a flow of charge air, comprising:
    directing a flow of charge air through a first and a second stage of a charge air cooler in sequential order;
    receiving a flow of liquid coolant into the charge air cooler and separating said flow of liquid coolant within the charge air cooler into a first portion and a second portion;
    reducing the temperature of the first portion by rejecting heat to a refrigerant;
    directing the second portion through the first stage of the charge air cooler in order to reduce the temperature of the charge air;
    directing the first portion through the second stage of the charge air cooler after having rejected heat to the refrigerant, in order to further reduce the temperature of the charge air; and
    recombining the first and second portions of the flow of liquid coolant,
    wherein the flow of charge air enters the first stage of the charge air cooler at a first temperature and exits the second stage of the charge air cooler second temperature, and wherein the flow of liquid coolant is received into the charge air cooler at a third temperature that is less than the first temperature and greater than the second temperature.

2. The method of claim 1, wherein the step of receiving a flow of liquid coolant and separating said flow of liquid coolant into a first portion and a second portion includes:
    receiving the flow of liquid coolant into a coolant manifold through an inlet arranged at a first end of the coolant manifold;
    allowing a quantity of the flow of liquid coolant to pass through the coolant manifold and to exit the coolant manifold through an outlet arranged at a second end of the coolant manifold opposite the first end, said quantity defining the second portion of the flow of liquid coolant; and
    directing the remaining quantity of the flow of liquid coolant through a plurality of flow apertures in fluid communication with the manifold between the first and second ends, said remaining quantity defining the first portion of the flow of liquid coolant.

3. The method of claim 1, wherein the step of directing the first portion through the second stage of the charge air cooler after having rejected heat to the refrigerant, in order to further reduce the temperature of the charge air comprises:
    flowing the first portion along a first flow pass extending along a transverse direction to the flow of charge air passing through the second section; and
    subsequently flowing the first portion along a second flow pass extending along a transverse direction to the flow of charge air passing through the second section, wherein the second flow pass is arranged upstream of the first flow pass with respect to the charge air flow direction.

4. The method of claim 1, wherein the step of directing the second portion through the first stage of the charge air cooler in order to reduce the temperature of the charge air comprises:
    flowing the second portion along a first flow pass extending along a transverse direction to the flow of charge air passing through the first section; and
    subsequently flowing the first portion along a second flow pass extending along a transverse direction to the flow of charge air passing through the second section, wherein the second flow pass is arranged upstream of the first flow pass with respect to the charge air flow direction.

5. The method of claim 1, wherein the step of directing a flow of charge air through a first and a second stage of a charge air cooler in sequential order includes directing the flow of charge air into a plurality of parallel arranged air flow channels, each of said channels extending continuously between an inlet face of the first stage and an outlet face of the second stage.

6. A charge air cooler comprising:
    a coolant inlet port to receive a flow of liquid coolant into the charge air cooler, the flow of liquid coolant being separated into a first flow of liquid coolant and a second flow of liquid coolant within the charge air cooler;
a first heat exchange section to transfer heat from the first flow of liquid coolant to a flow of refrigerant in order to cool the first flow of liquid coolant from a first temperature to a second temperature;
a second heat exchange section to transfer heat from a flow of charge air to the second flow of liquid coolant in order to cool the flow of charge air from a third temperature to a fourth temperature;
a third heat exchange section to transfer heat from the flow of charge air to the first flow of liquid coolant in order to cool the flow of charge air from the fourth temperature to a fifth temperature, wherein the fifth temperature is less than the first temperature; and
a coolant outlet port to deliver the first and the second flows of liquid coolant from the charge air cooler as a combined coolant flow.

7. The charge air cooler of claim 6, further comprising a plurality of parallel arranged air flow channels, each of said channels extending continuously between a charge air inlet face of the second heat exchange section and a charge air outlet face of the third heat exchange section.

8. The charge air cooler of claim 6, further comprising:
a first coolant inlet manifold and a first coolant outlet manifold associated with the first heat exchange section;
a first plurality of coolant flow passages extending through the first heat exchange section between the first coolant inlet manifold and the first coolant outlet manifold;
a second coolant inlet manifold and a second coolant outlet manifold associated with the second heat exchange section;
a second plurality of coolant flow passages extending through the second heat exchange section between the second coolant inlet manifold and the second coolant outlet manifold;
a third coolant inlet manifold and a third coolant outlet manifold associated with the third heat exchange section; and
a third plurality of coolant flow passages extending through the third heat exchange section between the third coolant inlet manifold and the third coolant outlet manifold;
wherein the third coolant inlet manifold is in fluid communication with the first coolant outlet manifold in order to receive the first flow of liquid coolant therefrom.

9. The charge air cooler of claim 8, wherein the second coolant inlet manifold is in fluid communication with the first coolant inlet manifold in order to receive the second flow of liquid coolant therefrom.

10. A charge air cooler comprising:
a first stack of plates joined to define alternating layers of liquid coolant passages and refrigerant passages;
a second stack of plates joined to define alternating layers of liquid coolant passages and air flow passages;
a mounting plate arranged between the first and the second stack of plates;
a first coolant inlet manifold extending through the first stack of plates and fluidly coupled to inlet ends of the liquid coolant passages of the first stack;
a first coolant outlet manifold extending through the first stack of plates and fluidly coupled to outlet ends of the liquid coolant passages of the first stack;
a second coolant inlet manifold extending through the second stack of plates and fluidly coupled to inlet ends of a first subset of the liquid coolant passages of the second stack; and
an aperture extending through the mounting plate and providing a fluid communication pathway between the first coolant outlet manifold and the second coolant inlet manifold.

11. The charge air cooler of claim 10, further comprising:
a third coolant inlet manifold extending through the second stack of plates and fluidly coupled to inlet ends of a second subset of the liquid coolant passages of the second stack; and
an aperture extending through the mounting plate and providing a fluid communication pathway between the first coolant inlet manifold and the third coolant inlet manifold.

12. The charge air cooler of claim 10, further comprising a coolant outlet port joined to the mounting plate and configured to receive all of the liquid coolant that has passed through both the liquid coolant passages of the first stack and the liquid coolant passages of the second stack.

13. The charge air cooler of claim 10, further comprising:
a second coolant outlet manifold extending through the second stack of plates and fluidly coupled to outlet ends of the first subset of the liquid coolant passages of the second stack;
a third coolant outlet manifold extending through the second stack of plates and fluidly coupled to outlet ends of the second subset of the liquid coolant passages of the second stack; and
a coolant outlet port joined to the mounting plate and fluidly connected to the second coolant outlet manifold and the third coolant outlet manifold.

14. The charge air cooler of claim 10, further comprising a coolant inlet port arranged at an end of the first coolant inlet manifold, wherein said coolant inlet port provides coolant to both the liquid coolant passages of the first stack of plates and the liquid coolant passages of the second stack of plates.

15. The charge air cooler of claim 14, wherein all of the coolant supplied through the coolant inlet port passes through the liquid coolant passages of the second stack of plates.

* * * * *